United States Patent
Gaines et al.

(10) Patent No.: US 8,146,139 B2
(45) Date of Patent: Mar. 27, 2012

(54) SYSTEM AND METHOD OF USER AUTHENTICATION USING HANDWRITTEN SIGNATURES FOR AN MFP

(75) Inventors: Mark Gaines, Hawthorne, CA (US); Constantinos Kardamilas, Irvine, CA (US); Steve Livengood, Laguna Niguel, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 1234 days.

(21) Appl. No.: 11/479,443

(22) Filed: Jun. 30, 2006

(65) Prior Publication Data

US 2008/0005579 A1  Jan. 3, 2008

(51) Int. Cl.
*H04L 9/32* (2006.01)
*H04L 9/00* (2006.01)
*H04K 1/00* (2006.01)
*G06F 17/30* (2006.01)
*G06F 11/30* (2006.01)

(52) U.S. Cl. ............. 726/4; 726/2; 726/5; 726/6; 726/9; 726/28; 726/31; 715/201; 715/221; 715/222; 715/223; 715/224; 715/268; 713/176; 713/180; 713/181; 713/186; 707/698; 382/115; 382/116; 382/119; 382/140; 382/176; 382/177; 382/179; 382/186; 382/190; 382/195; 382/203; 382/209; 382/216; 382/218; 382/229; 382/317; 382/318

(58) Field of Classification Search ........................ 726/4
See application file for complete search history.

(56) References Cited

U.S. PATENT DOCUMENTS

| | | | | |
|---|---|---|---|---|
| 4,701,960 A * | 10/1987 | Scott | .............................. | 382/122 |
| 5,297,202 A * | 3/1994 | Kapp et al. | ....................... | 705/75 |
| 5,322,978 A * | 6/1994 | Protheroe et al. | .......... | 178/18.03 |
| 5,544,255 A * | 8/1996 | Smithies et al. | ............... | 382/119 |
| 5,647,017 A * | 7/1997 | Smithies et al. | ............... | 382/119 |
| 5,859,967 A * | 1/1999 | Kaufeld et al. | .................... | 726/5 |
| 6,073,118 A * | 6/2000 | Gormish et al. | ................. | 705/39 |
| 6,978,019 B1 * | 12/2005 | Lapstun et al. | .................. | 380/51 |
| 7,197,167 B2 * | 3/2007 | Chung et al. | ................... | 382/123 |
| 7,254,839 B2 * | 8/2007 | Fahraeus et al. | ................. | 726/34 |
| 7,363,505 B2 * | 4/2008 | Black | ............................. | 713/186 |
| 7,380,121 B2 * | 5/2008 | Nomura et al. | ............... | 713/166 |
| 7,933,840 B2 * | 4/2011 | Zank | ................................ | 705/64 |
| 2003/0040128 A1 * | 2/2003 | Meador et al. | ................. | 436/518 |
| 2004/0027603 A1 * | 2/2004 | Ueda et al. | .................... | 358/1.14 |
| 2004/0128532 A1 * | 7/2004 | Ohishi et al. | .................. | 713/200 |
| 2006/0230286 A1 * | 10/2006 | Kitada | ........................... | 713/186 |

OTHER PUBLICATIONS

Adobe Systems Incorporated, 'Electronic signatures:Solution scenarios for your IT environment', © 2008 Adobe Systems Incorporated, entire document, http://www.adobe.com/products/livecycle/pdfs/95011606_Digital_Signature_wp_ue.pdf.*

* cited by examiner

*Primary Examiner* — Christian Laforgia
*Assistant Examiner* — Ronald Baum

(57) ABSTRACT

The invention relates to the authentication of users for a multi-function peripheral (MFP) device using handwritten signatures. Systems and methods are disclosed which relate to a MFP that conditions access to MFP operations based on an authenticating process that compares a prospective user's signature to previously saved signatures. The signatures are communicated to the MFP using the MFP's native scanning function.

26 Claims, 6 Drawing Sheets

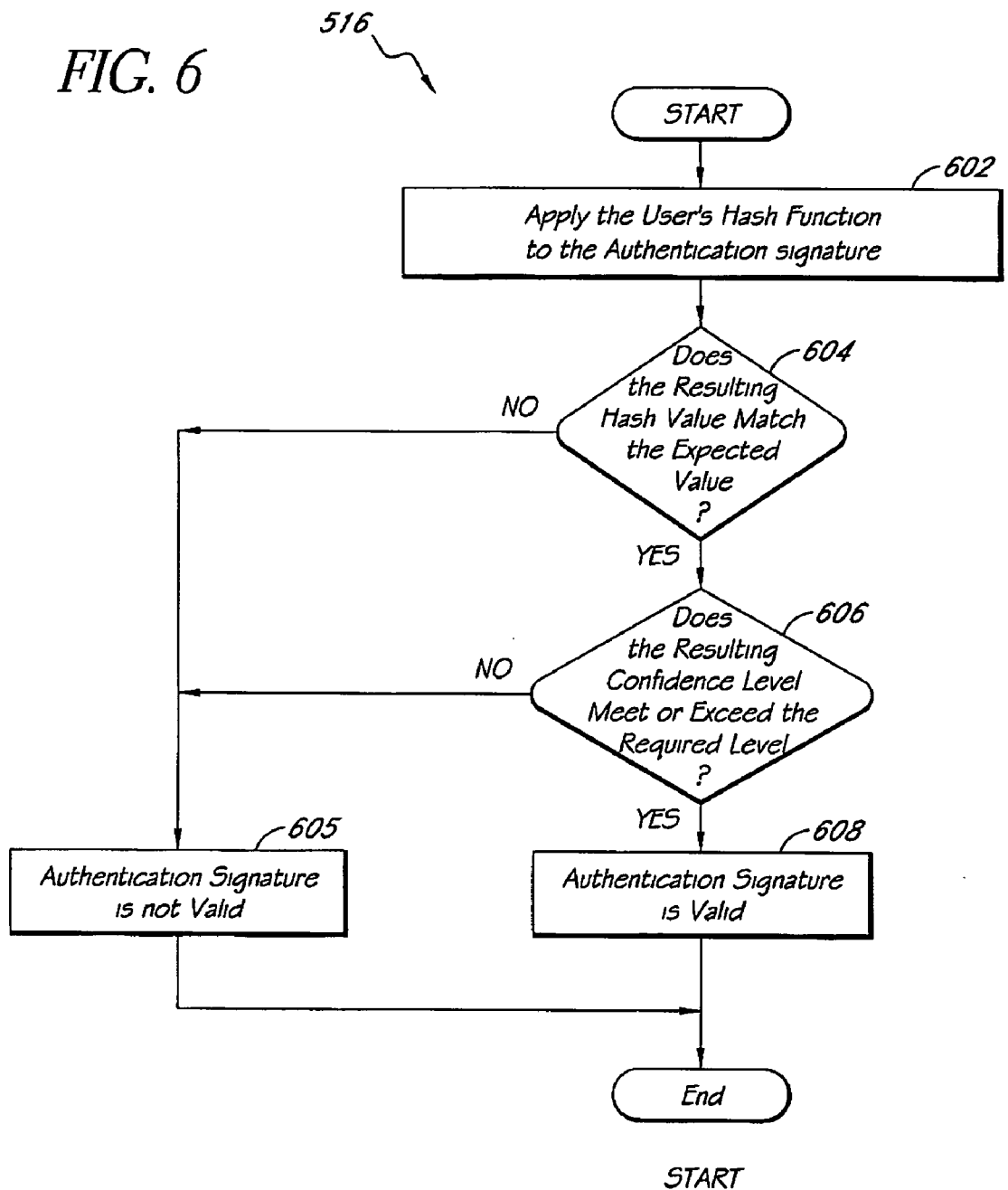

SYSTEM AND METHOD OF USER AUTHENTICATION USING HANDWRITTEN SIGNATURES FOR AN MFP

BACKGROUND OF THE INVENTION

1. Field of the Invention

The invention relates to the operation of a multi-function peripheral (MFP) device. More particularly, the invention relates to authentication of MFP users.

2. Description of the Related Technology

Presently, many peripheral devices have limited authentication abilities. One kind of peripheral device is a multi-function peripheral (MFP), which is a device that performs multiple peripheral functions, such as printing, copying, scanning, and faxing. (MFP devices are described in more detail below.)

Authentication services limit the operation of peripheral devices to those persons identified as having access (or authorization) to use the device. Providing authentication services may be an important element for maintaining the safety and security of peripheral devices. Some authentication services may have undesirable costs or may be inconvenient for users. Hence, there is a need for improved authentication services for an MFP.

SUMMARY OF CERTAIN INVENTIVE ASPECTS

In general, aspects of the invention relate to improved authentication mechanisms for multi-function peripheral (MFP) devices. Specifically, the invention relates to using something a user has possession of as a way to authenticate user identity in order to access the operations of an MFP device. In some embodiments, a user's handwritten signature is used to verify the identity of an MFP user. After authenticating the user's signature, the MFP may allow access to certain device privileges authorized to the user who provided the corresponding signature.

In one embodiment, a method of authentication services for a multi-function peripheral (MFP) device is provided. The method may comprise: storing reference information associated with the handwritten signature of an authorized user; receiving an authenticating handwritten signature from a prospective user of an MFP; comparing the authenticating handwritten signature with the reference information; and permitting access to the MFP based, at least in part, on the comparison.

In another embodiment, a multi-function peripheral (MFP) system with handwritten signature authentication is provided. The system may comprise: means for storing reference information associated with the handwritten signature of an authorized user; means for receiving an authenticating handwritten signature from a prospective user of an MFP; means for comparing the authenticating handwritten signature with the reference information; and means for permitting access to the MFP based, at least in part, on the comparison.

In another embodiment, a method of representing handwritten signatures as a calculated composite is provided. The method may comprise: capturing an image of a signature reference form, wherein the signature reference form comprises a plurality of handwritten signatures; extracting digital representations of the at least two handwritten signatures from the image; and storing the digital representations as a calculated composite.

In another embodiment, a multi-function peripheral (MFP) system with handwritten signature authentication is provided. The system may comprise: an MFP, the MFP equipped to perform the functions of scanning and printing, and further equipped to communicate with an authentication module; an authentication database, the authentication database comprising at least one digital representation of at least one reference handwritten signature; and an authentication module, the authentication module configured to receive an image of at least one authenticating handwritten signature in a communication from the MFP, further configured to compare the at least one authenticating handwritten signature with the at least one digital representation of the at least one reference handwritten signature, and further configured to communicate an authenticating message to the MFP.

In another embodiment, a multi-function peripheral (MFP) device with handwritten signature authentication is provided. The device may comprise: an MFP, the MFP being equipped with an optical scanner, wherein the MFP is configured to communicate at least one scanned image of at least one handwritten signature to an authentication module, and wherein the MFP is configured to condition access to the operations of the MFP based on an authenticating communication from the authentication module.

In another embodiment, a method of authentication services for a multi-function peripheral (MFP) device is provided. The method may comprise: storing reference information associated with a personal credential of an authorized user; receiving an authenticating personal credential from a prospective user of an MFP; comparing the authenticating personal credential with the reference information; and permitting access to the MFP based, at least in part, on the comparison.

BRIEF DESCRIPTION OF THE DRAWINGS

FIG. 6 illustrates a flow chart of the operations to process the authentication signature to determine if it is valid.

DETAILED DESCRIPTION OF CERTAIN INVENTIVE EMBODIMENTS

Figure 1:
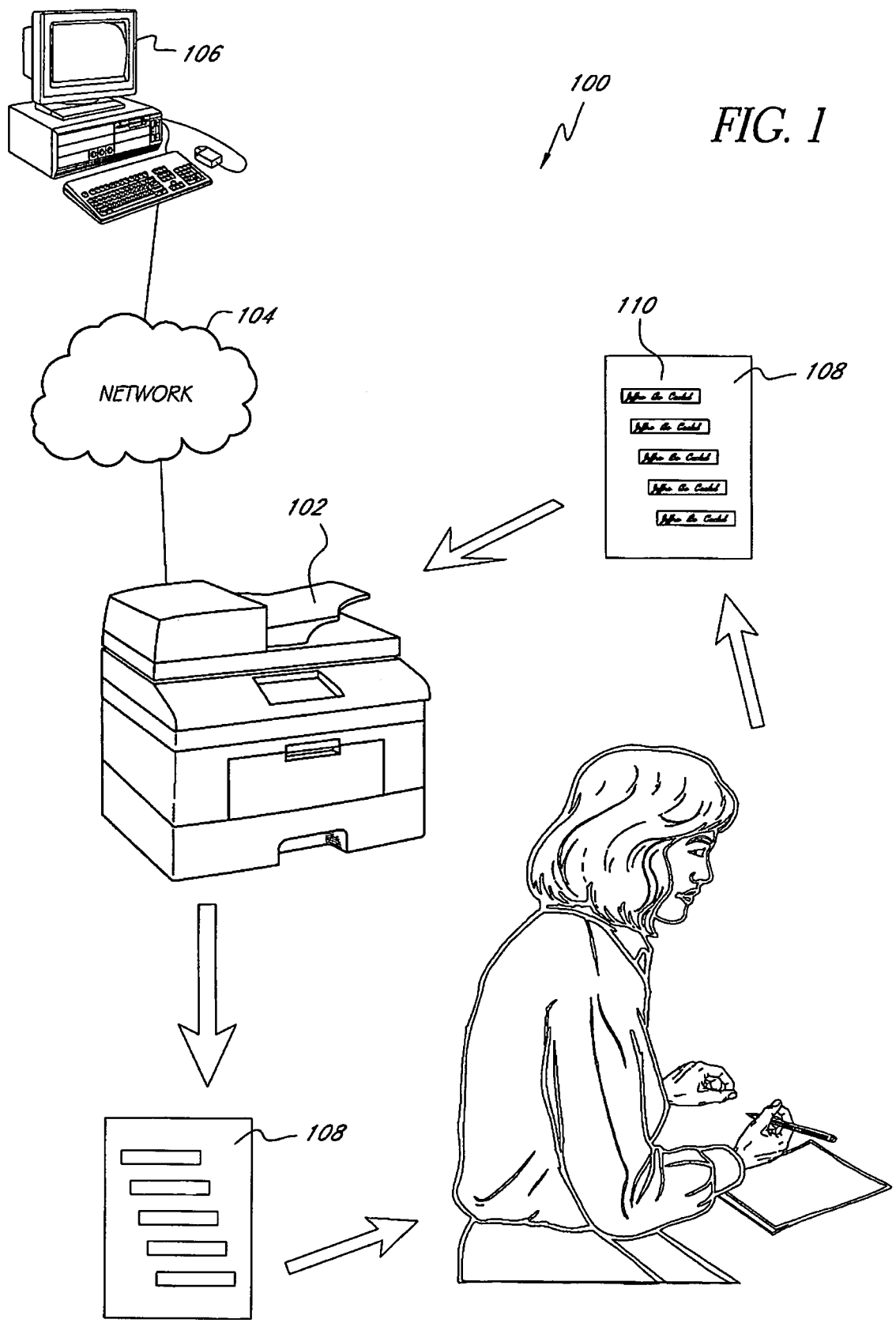
FIG. 1 illustrates a multi-function peripheral (MFP) system configured to receive a reference signature form.

Various aspects and features of the invention will become more fully apparent from the following description and appended claims taken in conjunction with the foregoing drawings. In the drawings, like reference numerals indicate identical or functionally similar elements. The drawings, associated descriptions, and specific implementation are provided to illustrate the embodiments of the invention and not to limit the scope of the disclosure.

In general, the invention relates to methods, systems, and software for implementing user authentication in a multi-function peripheral (MFP) system with handwritten signature authentication. (MFP devices are defined in more detail below.) There are many instances when system administrators and others may desire to implement user authentication with MFP devices through the use of signature authentication techniques. Existing authentication techniques for MFP devices do not include handwritten authentication. One purpose of the invention is to provide enhanced MFP authentication services so that a user of an MFP may be authenticated via a handwritten signature.

Existing printer and MFP products employing authentication techniques are usually limited to the use of a simple user name and password that are checked against an authentication database, which stores valid user names and passwords. While this "something you know" information provides some level of confidence that the user is who they claim to be, it may be less reliable than information from "something you have," such as a unique token. Embodiments of the invention make authentication more reliable by verifying information that a user has, or can reproduce, such as a handwritten signature. Handwritten signatures provided at the time of desired use may be checked against a user's known signature stored in an authentication database.

Figure 2:
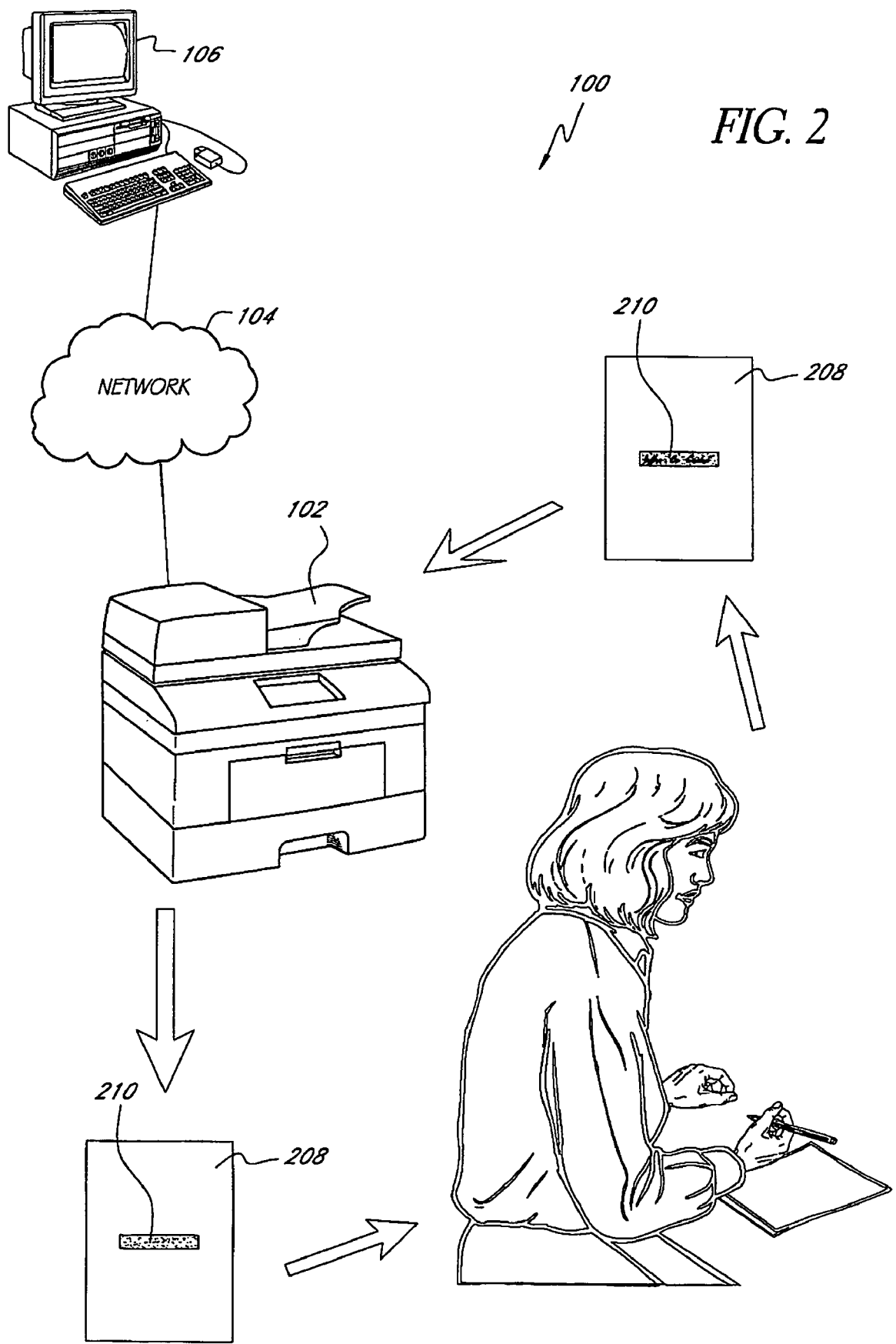
FIG. 2 illustrates a multi-function peripheral (MFP) system configured to receive an authentication signature form.
Figure 3A:
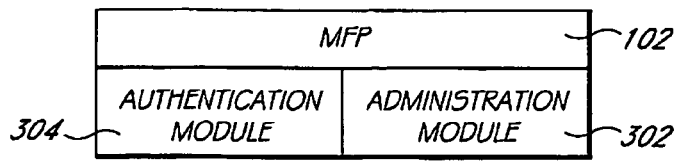
FIGS. 3A, 3B, 3C, 3D, and 3E illustrates various configurations of a multi-function peripheral (MFP) system for handwritten signature authentication.

Embodiments of the invention may comprise acquiring a user's reference signature to be stored in an authentication database, acquiring a user's authentication signature at the time of authentication, and comparing the two signatures at authentication time to validate the identity of the user with a reasonably high level of confidence. FIGS. 1, 2, and 3A illustrate an embodiment of the invention that localizes all of the necessary functions to a single MFP (with the authentication database and the appropriate instruction modules stored by the MFP itself). Some alternative embodiments include network distributions of the authentication database and instruction modules, and further include providing authentication services for other devices. Some of these alternative embodiments are described with reference to FIGS. 3B, 3C, 3D, and 3E.

The term capture may refer to the action of capturing a digital image. Thus, optical scanners, capacitive scanners, digital cameras, combinations of the same and the like may capture digital images. The phrase digital representation may refer to a way of representing a material object in digital form, that is, as a collection of electronic bits. This application often refers to digital representations in the context of capturing an image of a material object, or of converting the information contained in an image into a derivative form. Thus, a captured image is a digital representation. Furthermore, information extracted from the image may be represented digitally. For instance, a hash function may represent a handwritten signature, or some reasonable variance thereof.

A multi-function peripheral (MFP) device is an integrated device configured to perform two or more functions, including without limitation scanning, copying, printing, faxing, combinations of the same and the like. The functionality of an MFP device may be accessed over a network, including, for example, the Internet or a LAN, or at the device itself. An MFP device may be configured with sufficient memory to queue jobs waiting to be processed. It will be appreciated that MFP devices may be configured to perform in a variety of different networked and standalone computing environments.

The word module may refer to logic embodied in hardware or firmware, or to a collection of software instructions, possibly having entry and exit points, written in a programming language, such as, for example, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware.

Although the following embodiments discuss the invention with reference to an MFP device, the invention is not limited to MFP devices, as the enhanced notification services may also be applied to single-function peripheral devices as well. Moreover, embodiments of a handwritten signature authenticating MFP may also include an aggregate of single-function (or multi-function) peripheral devices.

FIG. 1 illustrates a multi-function peripheral (MFP) system 100 configured to receive a reference signature. In the illustrated embodiment, the MFP system 100 comprises an MFP device 102, which is configured, at least, to perform the functions of printing and scanning. In some embodiments, MFP device 102 may be connected via a network, such as network 104, to other computing devices, such as computing device 106. In other embodiments, MFP device 102 may be a stand alone device that operates without being connected to a network. As described in more detail below, with reference to FIGS. 3A, 3B, 3C, 3D, and 3E, a multi-function peripheral (MFP) system 100 with handwritten signature authentication may be implemented in a variety of different software and/or hardware configurations.

In order to be authorized to use the MFP device 102, a user is registered as an authorized user of the MFP device 102. In some embodiments, an authorized administrator (not illustrated), including possibly the user, initiates a new user registration procedure on the MFP 102. An authorized administrator may access the MFP device 102 via a network, such as network 104, a network computing device, such as network computing device 106. Additionally or alternatively, an authorized administrator may also access the MFP device 102 via the onboard user interface of the MFP device 102. An administrator may register the new user by creating a user profile and storing the profile in an authentication database. The user profiles may contain identifying information for the user, such as the user name and other relevant information, such as a user's personal identification number (PIN). Additionally, the user profiles may contain a digital representation (or multiple digital representations) of a user's handwritten signature. The operations that execute the creation of user profiles and their storage into an authentication database may generally be referred to as an administration module. The operations of an exemplary administration module are described below with reference to FIG. 4.

In some embodiments, the digital representation of a user's handwritten signature stored in a user's profile may be derived from a scanned image of the user's handwritten signature. In the illustrated embodiment, a digital representation of the user's handwritten signature is derived from a signed reference signature form 108, comprising multiple reference signature fields 110, which is scanned into the MFP 102. In general, acquiring a user's reference signature may involve using the MFP 102 to print the reference signature form 108, having the user sign the reference signature form 108 in the reference signature fields 110, and then scanning the reference signature form 108 with the scanning function of the MFP 102. From the scanned image, a digital representation of the user's signature may be derived. This is process is described in greater detail below with reference to FIG. 4.

At the user's request, the MFP 102 may print a reference signature form 108. In some embodiments, the printing of the reference signature form 108 and the entry of a new user profile are independent. For instance, there may be no time limit imposed between the printing of the reference signature form 108 and the initiation of the new user registration. In other embodiments, there may be a time limit imposed between the printing of the reference signature form 108 and the initiation of the new user registration process. In still other embodiments, the reference signature form 108 may be printed on other printing devices separate from the MFP 102.

In the illustrated embodiment, after the user signs his/her signature in the reference signature fields 110 of the reference signature form 108, the user scans the reference signature form 108 using the scanning function of MFP 102. Although in the illustrated embodiment an image of the reference signature form 108 was captured via the scanning function of the MFP 102, in other embodiments an image of the reference signature form 108 may be captured through other image capturing devices, such as a digital camera lens. Any suitable image sensor may be used to obtain an image of the reference signature form 108. Moreover, in other embodiments, an MFP may come equipped with a specialized sensor for recognizing handwriting, such as those commonly employed by Personal Digital Assistants. In these embodiments, the handwritten signature may not be captured as an image, but rather represented in some other digital form. Other representations may be further derived from these initial representations. In yet other embodiments, an image, or other digital representation of a handwritten signature, may be obtained from a source other than the reference signature form 108. By way of example, a driver's license or passport with a user's signature may be scanned in order to obtain an image of the signature. It will be appreciated by one skilled in the art that there are many ways to obtain an image or other digital representation of a handwritten signature.

In the illustrated embodiment, the reference signature form 108 contains multiple empty boxes, the reference signature fields 110, into which the user may write their signature. Multiple signatures are obtained to capture common variation in the user's signature. In some embodiments, the MFP 102 may reject the reference signature form 108 if any of the fields are left blank or otherwise unreadable. In other embodiments, the MFP 102 may accept the reference signature form 108 so long as at least one field 110 has been signed. In the illustrated embodiment, the MFP stores the multiple signatures as a calculated composite which is both efficient for storage and ready for analytical comparison with an authentication signature. (This process is described in greater detail below with reference to FIG. 4.)

FIG. 2 illustrates a multi-function peripheral (MFP) system configured to receive an authentication signature form 208. When a user desires to be authenticated, the user initiates the authentication sequence on the MFP 102. In general, this sequence involves printing an authentication signature form 208, signing the authentication signature form 208 in the space indicated (the authentication signature field 210), scanning the signed authentication signature form 208, and comparing the provided authentication signature with the reference signature for the user. In some embodiments, a time restriction may be imposed between the printing of the authentication signature form 208 and the scanning of the signed authentication signature form 208. The time allowed between these two activities may be very short, for instance, ten to twenty seconds. In some embodiments, this feature is configurable by an authorized administrator. The brief time period ensures that the signer is actually present at the MFP 102, and helps to minimize the possibility of forgery.

In some embodiments, to initiate authentication, the user provides his/her personal identification number (PIN). If the correct PIN is entered, the MFP generates an authentication signature form 208 and prints it. In the illustrated embodiment, the authentication signature form 208 is a unique form. Each authentication signature form 208 generated is made unique by including one or more images that are dynamically generated. The generated image(s) may be unique based on at least the PIN of the user and the date and time. In the illustrated embodiment, at least one image may be placed across the signing box. In the illustrated embodiment, the user signs the unique signature authentication form 208 within the bounds of the signing box provided—the authentication signature field 210. In doing so, the signature will be written on top of the one or more unique images. This ensures that a copy of a signature is not simply pasted onto the form. In the illustrated embodiment, the signed authentication signature form 208 is scanned, within the allotted time for printing the authentication signature form 208. The MFP 102 then processes the scanned signature to validate that it is written on top of the relevant image(s) just generated, and to extricate the signature from the image. If the image(s) does not match the one(s) just printed, the authentication is rejected. The extracted authentication signature is then processed appropriately to compare it with the reference signature for the user. The comparison process is described in more detail below with reference to FIGS. 5 and 6. The operations performed to authenticate a user's signature are collectively referred to as an authentication module.

Figure 3B:
Figure 3C:
Figure 3D:
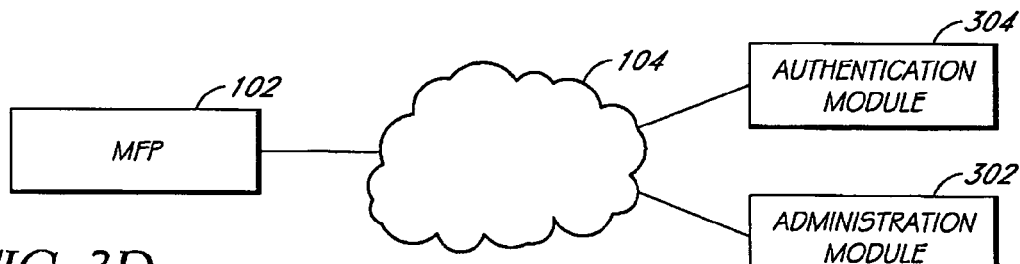

FIGS. 3A, 3B, 3C, 3D, and 3E illustrates various configurations of a multi-function peripheral (MFP) system for handwritten signature authentication. In the illustrated embodiment, the authentication services, including the administration and authentication modules, are stored and operated locally on the MFP 102, as illustrated in FIG. 3A. It will be appreciated, however, that many unique configurations are possible. For instance, although in the embodiment illustrated in FIGS. 1, 2, and 3A, it is contemplated that an administrator, including possibly the user, may access the administration module 302 remotely, in some embodiments the administration module 302 may also reside on a remote machine connected to the MFP 102 through a network, such as network 104, as illustrated in FIG. 3B. In other embodiments, the authentication module 304 may reside on a remote machine, as illustrated in FIG. 3C. In still other embodiments, the administration module 302 and the authentication module 304 may reside on a remote machine, or machines, as illustrated in FIG. 3D. Furthermore, the authentication database (not illustrated), which stores the user profiles containing the reference signature may be stored on the MFP 102 or another device connected via a network, such as network 104. It will be appreciated that the administration and authentication modules and the authentication database may be logical components of the same aggregate module and/or may comprise sub-modules. Referring to these separate modules and databases does not indicate that the operations or memory allocations are separate.

Figure 3E:
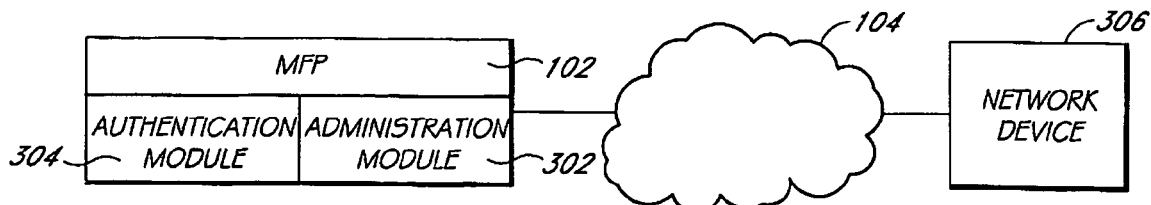

Furthermore, in the illustrated embodiment, the MFP 102 with handwritten signature authentication is intended to provide authentication solely for access to functionality provided by the MFP 102 itself. In other embodiments, however, it is possible for the MFP 102 to support the protocols required to act as an authentication service for other entities, such as network device 306, on a network, such as network 104. For instance, FIG. 3E illustrates an MFP 102 with an administration module 302 and authentication module 304 connected via a network 104 to a network device 306. Thus, a user may use the MFP 102 in order to gain access to network device 306. As described above with reference to FIGS. 3B, 3C, and 3D, the administration and authentication modules, as well as the authentication database, may be stored in and executed from (in the case of the modules) remote locations. These various illustrated configurations may also be used to provide authentication services to another device, such as network device 306. Thus, for instance, the MFP 102 may also be used as a device for use by a remote authentication service. The remote service might implement the authentication, but use services of the MFP 102 to print and scan the forms.

Figure 4:
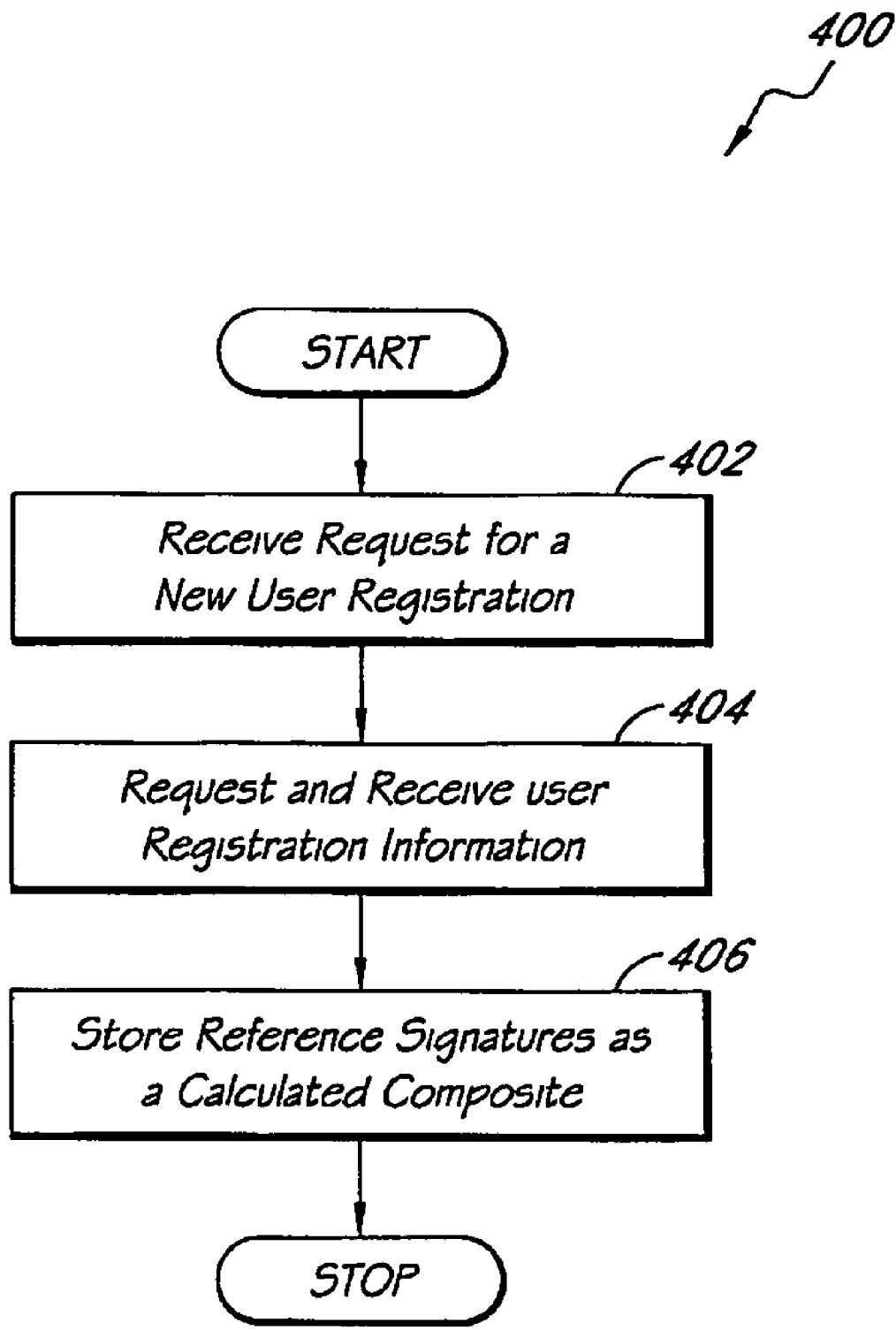
FIG. 4 illustrates a flow chart of a method to set up a multi-function peripheral (MFP) system with handwritten signature authentication.

FIG. 4 illustrates a flow chart of a method to set up a multi-function peripheral (MFP) system with handwritten signature authentication. These operations may collectively be referred to as an administration module, such as administration module 302. In state 402, the administration module 302 receives a request for a new user registration. In state 404, the administration module 302 requests and receives user registration information. In some embodiments, user registration information may comprise a user name, PIN, password, department name, permissions, and any other relevant information for using the operations of an MFP. In the illustrated embodiment, the user registration information comprises one or more reference signatures. The reference signatures may be entered via a scanned reference signature form 108, as described with reference to FIG. 1. Depending on the method of authentication, the administration module 302 may store the scanned image of the reference signature form 108, or may use the scanned image to derive other digital representations of the reference signature(s).

In the illustrated embodiment, the administration module 302, in state 406, stores the reference signatures as a calculated composite. In one embodiment, the calculated composite may be a hash function. For instance, the administration module 302 may process the multiple signatures to derive a hash function which yields hash values for a given signature. In one embodiment, the hash function may yield two values for a given signature. The first value may be a single value that is produced for any signature that is within some small variance of the reference signatures. This value is effectively unique, that is, it is distinct from the hash value for any other user's signature. The second value produced by the hash function may indicate the "confidence level" that a given signature matches the reference signatures. This is a value that may be suitably rendered as a "percent confident" level. The hash function for a user's signature, as well as the expected result value, may be stored in the authentication database as part of the registration procedure along with, for instance, the personal identification number (PIN).

Figure 5:
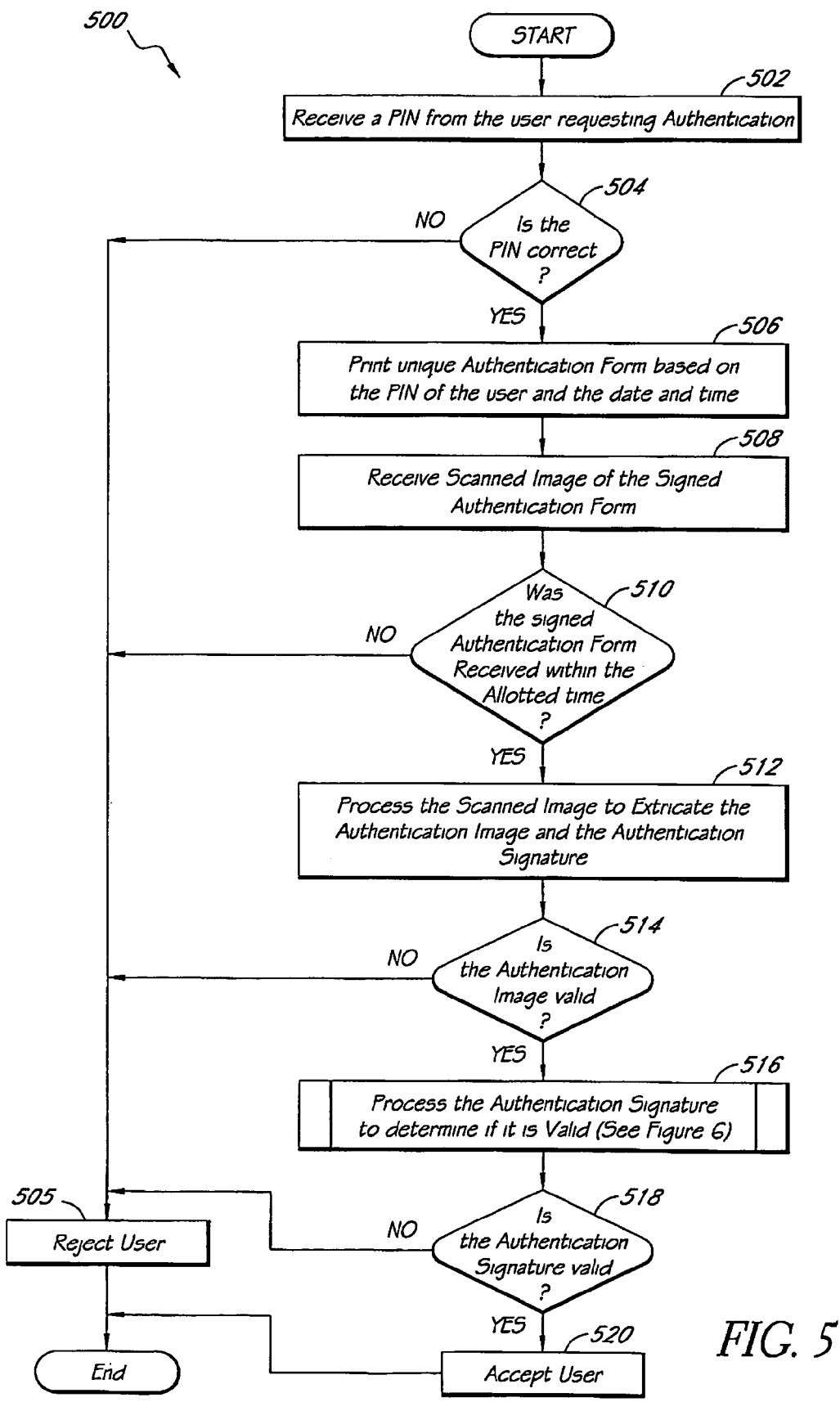
FIG. 5 illustrates a flow chart of a method to operate a multi-function peripheral (MFP) system with handwritten signature authentication.

FIG. 5 illustrates a flow chart of a method to operate a multi-function peripheral (MFP) system with handwritten signature authentication. These operations may collectively be referred to as an authentication module, such as authentication module 304. In state 502, the authentication module receives a PIN from the user requesting authentication. In state 504, the authentication module 304 determines if the PIN is correct. For instance, the authentication module 304 may search for a user registration entry containing the PIN number entered by the user. If the PIN is incorrect—that is, the PIN does not correspond to any of the user profiles—then the administration module proceeds to state 505, and rejects the user. If the PIN is correct, then the administration module 304 proceeds to state 506. In state 506, the authentication module 304 prints a unique authentication signature form 208 based on the PIN of the user and the date and time. The authentication signature form 208 is unique because of an image printed in the signature authentication field 210. That is, in the illustrated embodiment, the authentication signature form 208 is unique because the authentication signature field 210 comprises a unique image based on the PIN of the user and date and time.

Next, in state 508, the authentication module 304 receives the scanned image of the signed authentication signature form 208. In state 510, the authentication module 304 determines whether the signed authentication signature form 208 was received within the allotted time. If it was received within the allotted time, the authentication module proceeds to state 512. If, however, the signed authentication signature form 208 was not received within the allotted time, then the authentication module 304 proceeds to state 505, rejecting the user. In state 512, the authentication module processes the scanned image to extricate the authentication image and the authentication signature. In state 514, the authentication module determines whether the authentication image is valid. If the authentication image is not valid, then the authentication module 304 proceeds to state 505, rejecting the user. If, on the other hand, the authentication image is valid, then the authentication module 304 proceeds to state 516. In state 516, the authentication module processes the authentication signature to determine if it is valid. (This process is described in greater detail below with reference to FIG. 6.) If the authentication signature is valid, then the authentication module 304 accepts the user in state 520. If, on the other hand, the authentication signature was not valid, then the authentication module proceeds to state 505, rejecting the user.

FIG. 6 illustrates state 516 described with reference to FIG. 5. State 516 processes the authentication signature to determine if it is valid. In state 602, the authentication module applies the user's hash function to the authentication signature. In state 604, the authentication module 304 determines whether the resulting hash value matches the expected hash value for the user. If the values match, then the authentication module proceeds to state 606. If, on the other hand, the values do not match, then the authentication module 304 proceeds to state 605, determining that the authentication signature is not valid. In state 606, the authentication module 304 determines whether the resulting confidence level meets or exceeds the required level. If the confidence level meets or exceeds the required level, then the authentication module 304 proceeds to state 608, determining that the authentication signature is valid. If, on the other hand, the resulting confidence level does not meet or exceed the required level, then the authentication module 304 proceeds to state 605, determining that the authentication signature is not valid.

Although the invention has been described in terms of authenticating a handwritten signature, the same systems and methods may be used to authenticate an MFP user based on other forms of personal credentials, including without limitation, a driving license, passport, company badge, etc. In general, personal credentials are tangible items issued by an authorizing organization and may include a unique identifier (s) generated by the authorizing organization, such as a number, photograph, seal, symbol, image, and so forth. Embodiments of the invention may authenticate an MFP user based on scanning or otherwise submitting an image, digital representation, etc, of a personal credential and comparing it with a previously submitted image, digital representation, etc, of the personal credential.

Although this invention has been described in terms of certain embodiments, other embodiments that are apparent to those of ordinary skill in the art, including embodiments which do not provide all of the benefits and features set forth herein, are also within the scope of this invention. Accordingly, the scope of the present invention is defined only by reference to the appended claims.

What is claimed is:

1. A method of authentication services for a multi-function peripheral (MFP) device, the method comprising:
   printing an authentication signature form for receiving a reference handwritten signature;
   scanning the reference handwritten signature from the authentication signature form with the MFP as part of a reference information for authentication;
   receiving an authenticating handwritten signature on top of an unique image on another authentication signature form, the unique image dynamically generated in the MFP;
   comparing the authenticating handwritten signature with the reference handwritten signature and the unique image on the another authentication signature form with the unique image in the MFP; and
   permitting access to the MFP based, at least in part, on the comparison,
   wherein the MFP is an integrated peripheral device configured to perform two or more functions, and wherein the functions include scanning and printing.

2. The method of claim 1, wherein receiving an authenticating handwritten signature comprises receiving a scanned image of the authenticating handwritten signature.

3. The method of claim 1, wherein the reference information comprises a digital representation of at least one handwritten signature.

4. The method of claim 3, wherein the digital representation comprises a calculated composite of a plurality of handwritten signatures.

5. The method of claim 4, wherein the calculated composite is a hash function.

6. The method of claim 5, wherein comparing the authenticating handwritten signature with the reference information comprises applying the hash function to the authenticating handwritten signature to yield a hash value that indicates whether there is a match between the authenticating handwritten signature and the plurality of handwritten signatures used to derive the hash function.

7. The method, of claim 6, wherein comparing the authenticating handwritten signature with the reference information further comprises applying the hash function to the authenticating handwritten signature to yield a percent confidence level that there is a match between the authenticating handwritten signature and the plurality of handwritten signatures used to derive the hash function.

8. A multi-function peripheral (MFP) system with handwritten signature authentication, the system comprising:
   means for printing an authentication signature form for receiving a reference handwritten signature;
   means for scanning the reference handwritten signature from the authentication signature form with the MFP as part of a reference information for authentication;
   means for receiving an authenticating handwritten signature on top of an unique image on another authentication signature form, the unique image dynamically generated in the MFP; signature;
   means for comparing the authenticating handwritten signature with the reference handwritten signature and the unique image on the another authentication signature form with the unique image dynamically generated in the MFP; and
   means for permitting access to the MFP based, at least in part, on the comparison,
   wherein the MFP is configurable as both a stand alone peripheral device and a networked peripheral device configured to perform two or more integrated functions, and wherein at least one of the functions includes scanning, copying, printing, or faxing.

9. A method of representing handwritten signatures as a calculated composite, the method comprising:
   capturing an image of a signature reference form having dynamically generated unique images, wherein the signature reference form comprises a plurality of handwritten signatures on top of the unique images;
   extracting digital representations of the at least two handwritten signatures on top of the unique images from the image; and
   storing the digital representations as a calculated composite,
   wherein the method is performed in a multi-function peripheral (MFP) device configurable as a stand alone peripheral device configured to perform two or more integrated functions, and wherein at least one of the functions includes scanning, copying, printing, or faxing.

10. The method of claim 9, wherein the calculated composite is a hash function.

11. The method of claim 10, wherein the hash function is defined by the characteristic that applying a signature to the hash function yields a value that indicates whether the signature matches the signatures upon which the hash function was derived and also yields a value that indicates the percent confidence level that a matched signature matches the signatures upon which the hash function was derived.

12. A multi-function peripheral (MFP) system with handwritten signature authentication, the system comprising:
   an MFP, the MFP having integrated functions of scanning and printing for an authentication signature form for receiving a reference handwritten signature, and further equipped to communicate with an authentication module;
   an authentication database, the authentication database comprising at least one digital representation of at least one reference handwritten signature; and
   an authentication module, the authentication module configured to receive an image of at least one authenticating handwritten signature on top at least one unique image, dynamically generated in the MFP captured by the scanning function of the MFP in a communication from the MFP, further configured to compare the at least one authenticating handwritten signature with the at least one digital representation of the at least one reference handwritten signature and the at least one of the unique image in the MFP and further configured to communicate an authenticating message to the MFP.

13. The system of claim 12, wherein the authentication module resides on a device remotely connected to the MFP.

14. The system of claim 12, wherein the authentication module resides on the MFP.

15. The system of claim 12, wherein the authentication database resides on a device remotely connected to the MFP.

16. The system of claim 12, wherein the authentication database resides on the MFP.

17. The system of claim 12, further comprising an administration module, wherein the administration module is configured to enter the digital representation of the at least one reference handwritten signature based on at least one scanned image of at least one handwritten signature into an authentication database.

18. The system of claim 17, wherein the administration module resides on a device remotely connected to the MFP.

19. The system of claim 17, wherein the administration module resides on the MFP.

20. A multi-function peripheral (MFP) device with handwritten signature authentication, the device comprising:
an MFP, having two or more integrated functions including a scanning function and a printing function, the MFP having an integrated printer to print an authentication signature form having a unique image, dynamically generated in the MFP for receiving a reference handwritten signature, the MFP having an integrated optical scanner configured to capture an image of the reference handwritten signature on top of the unique image from the authentication signature form for authentication, wherein the MFP is configured to communicate at least one scanned image of at least one handwritten signature on top of at least one unique image dynamically generated in the MFP to an authentication module, and wherein the MFP is configured to condition access to the operations of the MFP based on an authenticating communication from the authentication module.

21. The system of claim 20, wherein the authentication module is a set of instructions executed on a device in data communication with the MFP.

22. The system of claim 20, wherein the authentication module is a set of instructions executed on a component of the MFP.

23. The system of claim 20, wherein the MFP is configured to communicate with the authentication module via either or both wired and wireless communication.

24. A method of authentication services for a multi-function peripheral (MFP) device, the method comprising:
storing reference information associated with a personal credential of an authorized user;
receiving an authenticating personal credential on top of an unique image dynamically generated in the MFP from a prospective user of an MFP via an integrated scanning function of the MFP;
comparing the authenticating personal credential and the unique image with the reference information and the unique image in the MFP; and
permitting access to the integrated scanning function and at least one additional integrated function of the MFP based, at least in part, on the comparison.

25. The method of claim 24, wherein the personal credential is one of the following: handwritten signature, driving license, passport, and company badge.

26. The method of claim 24, further comprising storing secondary reference information associated with a personal credential of an authorized user, receiving a secondary authenticating personal credential from a prospective user of an MFP, comparing the secondary authenticating personal credential with the reference information, and permitting access to the MFP based, at least in part, on the comparison.

* * * * *